United States Patent [19]

Sekiguchi et al.

[11] 4,177,977

[45] Dec. 11, 1979

[54] HYDROPNEUMATIC SUSPENSION UNIT WITH A LEVEL SELECTOR MECHANISM

[75] Inventors: Tomoyoshi Sekiguchi, Atsugi; Masayuki Fujii, Yokohama, both of Japan

[73] Assignee: Nissan Motor Company, Limited, Japan

[21] Appl. No.: 878,425

[22] Filed: Feb. 16, 1978

[30] Foreign Application Priority Data

Feb. 17, 1977 [JP] Japan .................. 52/16589

[51] Int. Cl.² .................. F16F 9/06; F16F 9/44; F16F 9/50
[52] U.S. Cl. .................. 267/64 R; 267/DIG. 1; 267/65 D
[58] Field of Search .................. 267/DIG. 1, DIG. 2, 267/64 R, 64 B, 65 D; 280/DIG. 1, 714

[56] References Cited

U.S. PATENT DOCUMENTS

| 3,071,394 | 1/1963 | Miller | 280/DIG. 1 |
| 3,807,753 | 4/1974 | Ito et al. | 267/64 R X |
| 3,810,611 | 5/1974 | Ito et al. | 267/64 R |
| 3,873,124 | 3/1975 | Ito et al. | 267/64 R X |
| 3,941,403 | 3/1976 | Hiruma | 267/65 D X |

FOREIGN PATENT DOCUMENTS

1901470 8/1969 Fed. Rep. of Germany.
2540368 3/1976 Fed. Rep. of Germany.

*Primary Examiner*—George E. A. Halvosa
*Attorney, Agent, or Firm*—Lane, Aitken & Ziems

[57] ABSTRACT

A movable reaction member is provided which is normally prevented from being moved to have a dashpot delay movement of a piston with a levelling valve operating member and which, when it is desired to change the vehicle body level to an optional value, is quickly moved integrally with the piston to render the dashpot ineffective to satisfactorily reduce the time necessary for changing the vehicle body level.

8 Claims, 4 Drawing Figures

HYDROPNEUMATIC SUSPENSION UNIT WITH A LEVEL SELECTOR MECHANISM

BACKGROUND OF THE INVENTION

1. Field of the Invention

The present invention relates generally to a vehicle level changing device of a hydropneumatic suspension unit for a wheeled vehicle and particularly to an improvement in the response of a vehicle level changing device of this type.

2. Description of the Prior Art

As is well known in the art, a hydropneumatic suspension unit used in a wheeled vehicle is usually provided with damping and levelling mechanisms. The damping mechanism serves to absorb and damp by, for example, a gas spring relative vertical movements of the body of the vehicle and wheel supporting means thereof caused by irregularities on the road surface on which the vehicle travels to make riding quality of an occupant of the vehicle comfortable. The levelling mechanism serves to maintain the level of the vehicle body at a constant value independently of a load applied to the vehicle body. Some hydropneumatic suspension units are provided with a level selector mechanism for changing the vehicle body level to an optional value.

However, a conventional level selector mechanism has had a drawback that an undesirably long time is required until the vehicle level changing operation is completed. Because of such a drawback, the vehicle body level has been changed to the optional value as the vehicle body is rolled and pitched to impart a feeling of unrest to an occupant of the vehicle.

SUMMARY OF THE INVENTION

It is, therefore, an object of the invention to provide a hydropneumatic suspension unit comprising an improved vehicle level selector mechanism which requires a desirably short time until the vehicle level changeing operation is completed.

This object is accomplished by providing reaction means which is normally prevented from being moved to cause movement of a piston having valve operating means to be resisted and delayed by an orifice and which is, only when it is desired to change the vehicle body level to an optional value, moved together with the piston to cause the piston to be quickly moved without being resisted and delayed by the orifice and cause the valve operating means to open the inlet or outlet control valve without a time delay, and means for causing the reaction means to be moved together with the piston when it is desired to change the vehicle body level to the optional value.

BRIEF DESCRIPTION OF THE DRAWINGS

This and other features and advantages of the invention will become more apparent from the following detailed description taken in connection with the accompanying drawings in which.

DETAILED DESCRIPTION OF THE PRIOR ART AND THE PREFERRED EMBODIMENTS

Figure 1:
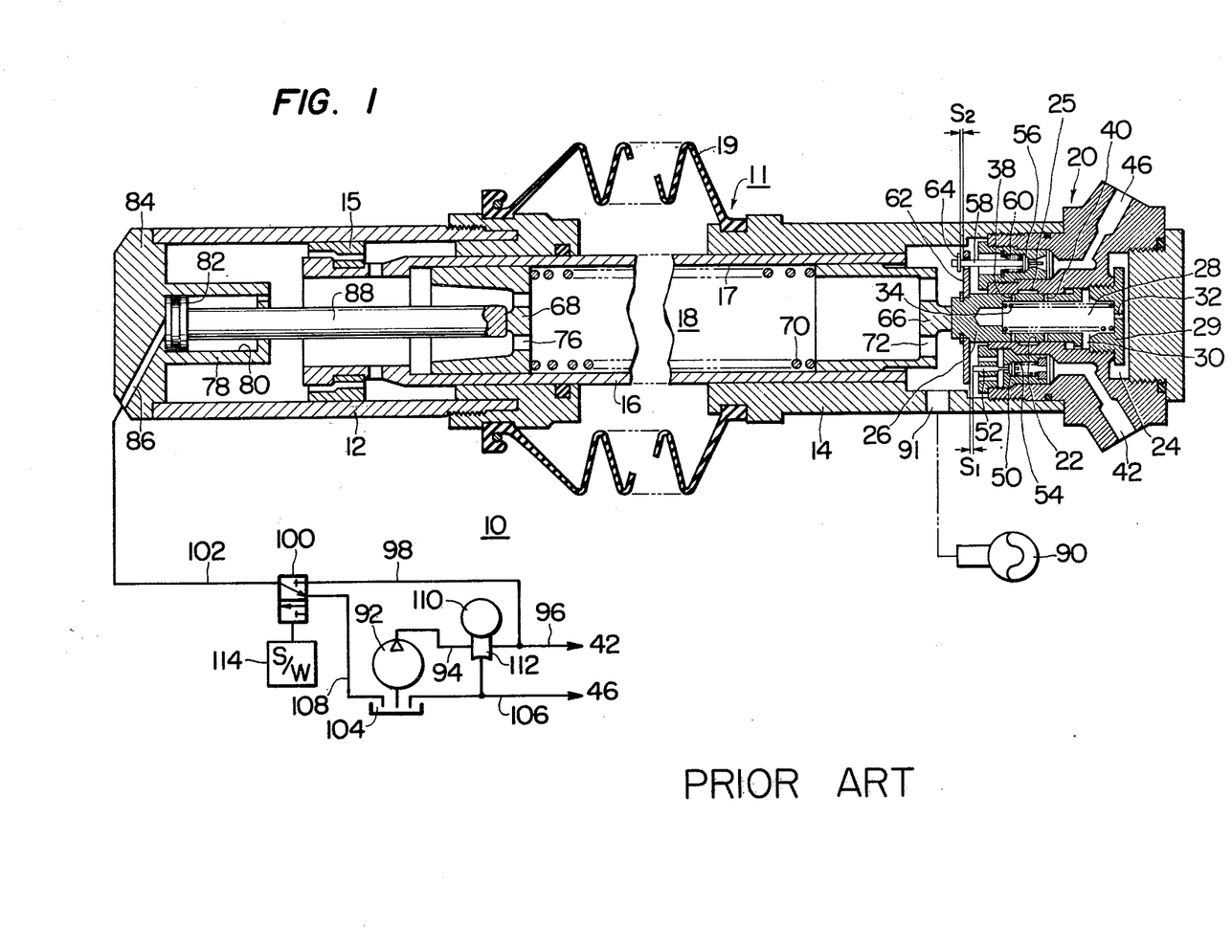
FIG. 1 is a schematic cross sectional view of an example of a conventional hydropneumatic suspension unit.

Referring to FIG. 1 of the drawings, there is shown a hydropneumatic suspension system 10 employed in a wheeled vehicle (not shown) and including a conventional hydropneumatic suspension unit or strut 11 which is provided with a vehicle level selector device. The suspension unit 11 includes a first hollow body 12 such as a cylinder fixedly connected to wheel supporting means (not shown) of the vehicle, a second hollow body 14 such as a cylinder fixedly secured to a body (not shown) of the vehicle, and an intermediate hollow body 16 such as a cylinder interposed between the first and second cylinders 12 and 14 to interconnect them. The cylinder 16 is slidably received or fitted in the first cylinder 12 and is fixedly mounted at the other end in the second cylinder 14 to form a part thereof. A piston 15 is fixedly secured to an end of the cylinder 16 and is slidably fitted in the cylinder 12. The connecting cylinder 16 is formed therethrough with a cylindrical bore 17. The interiors of the cylinders 12 and 14 and the bore 17 communicate with each other to form a pressurized hydraulic fluid chamber 18 which is sealed off from the ambient outside of the cylinders 12, 14 and 16. A resilient bellows 19 is fixedly secured at ends thereof respectively to the external wall surfaces of the first and second cylinders 12 and 14 to enclose opposite end portions of the cylinders 12 and 14.

The second cylinder 14 is provided with a cylinder head 20 which is fixedly secured to an open end portion of the second cylinder 14 to close the open end portion. The cylinder head 20 is formed therein with a bore 22 extending coaxially with the second cylinder 14, and a fluid chamber 24 a part of which is shown in FIG. 1 and which communicates with the interior of the second cylinder 14. The cylinder head 20 is further formed with a groove or recess 25 which is merged into the bore 22 and which communicates with the chamber 24 through a passage (not shown). A spool or piston 26 is axially slidably fitted in the bore 22 to cover the groove 25 and projects at an end thereof into the second cylinder 14. The piston 26 is formed therein with an axial bore 28 which has a blind end and an open end. A partition 29 is fixedly secured to the cylinder head 20 and faces the piston 26 in such a manner that a fluid chamber 30 is formed between the piston 26 and the partition 29. The partition 29 separates the fluid chambers 24 and 30 from each other. The bore 28 is merged at the open end into the fluid chamber 30. The partition 29 is formed therethrough with an orifice or a restricted passage 32 which provides communication between the fluid chambers 24 and 30. The orifice 32 is sized to limit or resist the flow of hydraulic fluid from the chamber 30 into the chamber 24 and vice versa caused by axial movements of the piston 26 toward and away from the partition 29 to cause the piston 26 to be slowly moved with a time delay. A compression spring 34 is provided to urge the piston 26 away from the partition 29. The piston 26 is formed with first and second radial passages 38 and 40 which both open into the bore 28 and which are spaced from each other. The passages 38 and 40 both are separated from the grooves 25 to separate the bore 28 from the chamber 24 when the piston 26 is in a neutral position shown in FIG. 1.

The cylinder head 20 is formed therein with inlet and outlet passages 42 and 46 which both open into the interior of the second cylinder 14. An inlet control valve 50 of a poppet type is disposed at one side of the piston 26 operably for opening and closing the inlet passage 42. An inlet valve operating rod 52 extends from the inlet control valve 50. A spring 54 is provided to urge the inlet control valve 50 into a closed position in which the valve 50 closes the inlet passage 42. An outlet control valve 56 of a poppet type is disposed at the other side of the piston 26 operably for opening and closing the outlet passage 46. An outlet valve operating rod 58 extends from the outlet control valve 56. A spring 60 is provided to urge the outlet control valve 56 into a closed position in which the valve 56 closes the outlet passage 46. Each of the inlet and outlet control valves 50 and 56 has an axis which is parallel with an axis of the piston 26 and in the direction of which the valve is movable. The inlet and outlet valves 50 and 56 are arranged symmetrically with respect to the piston 26. A valve operating arm 62 is fixedly secured to the piston 26 for opening the inlet and outlet control valves 50 and 56 when the piston 26 is moved respectively in opposite directions by certain distances from the neutral position. The valve operating arm 62 is spaced from a free end of the inlet valve operating rod 52 by a predetermined distance $S_1$ so that the inlet control valve 50 is in its closed position when the piston 26 is in the neutral position. The valve operating arm 62 is engaged against the free end of the inlet valve stem 52 to move the inlet control valve 50 in opposition to the force of the spring 54 into an open position in which the valve 50 opens the inlet passage 42 when the piston 26 is moved toward the partition 29 to move the valve operating arm 62 in excess of the predetermined distance $S_1$ from a neutral position shown in FIG. 1. The outlet valve stem 58 projects through the valve operating arm 62 in such a manner that the valve operating arm 62 can be freely moved relative to the valve stem 58. An abutment or a projection 64 in the form of a disc or a flange is fixedly secured to a portion of the outlet valve stem 58 which portion projects from the valve actuator 62. The abutment 64 is spaced from the valve actuator 62 by a predetermined distance $S_2$ so that the outlet control valve 56 is in its closed position when the piston 26 is in the neutral position. The valve actuator 62 is engaged against the abutment 64 to move the outlet control valve 56 in opposition to the force of the spring 60 into an open position in which the valve 56 opens the outlet passage 46 when the piston 26 is moved away from the partition 29 to move the valve actuator 62 in excess of the predetermined distance $S_2$ from the neutral position. At this time, the inlet control valve 50 is in the closed position. The predetermined distance $S_2$ may be equal to the predetermined distance $S_1$. The piston 26, the inlet and outlet control valves 50 and 56 and the valve actuator 62 constitute an automatic vehicle level maintaining device which serves to maintain the level of the vehicle body at a predetermined or selected constant value independently of a load applied to the vehicle body.

A piston actuator 66 in the form of a piston is slidably fitted in the bore 17 of the connecting cylinder 16 and is engaged at one end thereof against that end of the piston 26 which projects into the second cylinder 14. A piston or spring seat 68 is slidably fitted in the bore 17 at a location below the piston actuator 66 or left in the drawing of the piston 66. A control spring 70 is interposed in the bore 17 between the piston actuator 66 and the piston 68 to urge them in opposite directions and to press the piston actuator 66 against the piston 26. The spring 70 has a diameter near that of the bore 17 in such a manner that the spring 70 is guided by the wall surface of the bore 17 and does not incline or bend toward the wall surface of the bore 17. The piston actuator 66 is formed therethrough with an aperture or a passage 72 for providing communication between the interior of the second cylinder 14 and the bore 17 between the piston actuator 66 and the piston 68. The piston 68 is formed therethrough with an aperture or a passage 76 for providing communication between the interior of the first cylinder 12 and the bore 17 between the piston actuator 66 and the piston 68.

A cylinder 78 is fixedly secured to an end portion of the first cylinder 12 which portion closes an end thereof. The cylinder 78 is formed therein with a cylindrical bore 80 in which a piston 82 is slidably fitted. A fluid chamber 84 is defined between the piston 82 and an end wall surface of the bore 80. The first cylinder 12 is formed therein with a fluid passage 86 which communicates with the fluid chamber 84. A piston rod 88 extends from the piston 82 and is engaged at an end thereof against the piston 68. The piston 82, the fluid chamber 84 and the piston rod 88 constitute a vehicle level selecting device for adjusting or changing the level of the vehicle body to a different value. The piston actuator 66 and the piston 68 are held in a neutral or normal position shown in FIG. 1 by the forces of the springs 34 and 70 which are balanced with each other when the suspension unit 11 is in a normal condition in which the level of the vehicle body is maintained at the selected constant value. The pressurized hydraulic fluid chamber 18 communicates with a hydropneumatic accumulator or a gas spring 90 through a passage 91 formed in the second cylinder 14.

An outlet port of a hydraulic fluid pump 92 communicates with the inlet passage 42 through passages or conduits 94 and 96 and is communicable with the fluid passage 86 through the passage 94, a passage or conduit 98, a switching-over valve 100 and a passage or conduit 102. The pump 92 is driven by, for example, an engine (not shown) of the vehicle to draw hydraulic fluid from a hydraulic fluid tank or sump 104 and to produce a pressurized hydraulic fluid into the outlet port. The tank 104 communicates with the outlet passage 46 through a passage or conduit 106 and is communicable with the fluid passage 106 through a passage or conduit 108, the switching-over valve 100 and the passage 102. An accumulator 110 communicates with the passage 94. An unloaded valve 112 is disposed in the passage 94 and communicates with the passage 106 in such a manner that the hydraulic fluid control circuit of the suspension unit 11 constitutes a so-called closed center system. The switching-over valve 100 is operated through a switch 114 manipulated by the driver (not shown) of the vehicle to connect the passage 102 alternatively to the passages 98 and 108.

The hydropneumatic suspension system 10 thus described is operated in the following manner.

When the vehicle is moved up and down due to, for example, irregularities on the road surface on which the vehicle travels so that the suepension untul 11 is instantaneously alternately lengthened and shortened, the hydropneumatic spring 90 absorbs variations in the volume of hydraulic fluid in the chamber 18 of the cylinders 12, 14 and 16 which is caused by relative movements of the cylinders 12 and 14. In this instance, the piston 26 is prevented by the orifice 32 from being moved by the piston actuator 66 or the spring 34 the distance $S_1$ or $S_2$ from the neutral position into a position in which the valve actuator 62 opens the inlet or outlet control valve 50 or 56.

When the weight of the loading of the vehicle is increased to lower the level of the vehicle body, because a compression force acts on the cylinders 12 and 14 to shorten the suspension unit 11 and to compress the control spring 70, the force of the spring 70 is increased to move the piston actuator 66 rightwards in the drawing. The piston 26 is gradually moved by the piston actuator 66 rightwards in opposition to the force of the spring 34 to reduce the volume of the chamber 30, because the hydraulic fluid is gradually forced out from the chamber 30 into the chamber 24 through the orifice 32 by movement of the piston 26. When the piston 26 is moved the distance $S_1$ from the neutral position, the valve actuator 62 is engaged against the inlet valve stem 52 to open the inlet control valve 50 to cause supply of pressurized hydraulic fluid from the pump 92 into the chamber 18. Concurrently, the first passage 38 only communicates with the groove 25 to cause abrupt escape of hydraulic fluid from the bore 28 into the chamber 24. As a result, the movement of the piston 26 is hastened to cause abrupt increase in the degree of opening of the inlet control valve 50 and therefore in the supply of pressurized hydraulic fluid into the chamber 18. The quantity of pressurized hydraulic fluid in the chamber 18 is increased to cause lengthening of the suspension unit 11 to cause expansion of the control spring 70 and to raise the level of the vehicle body to a former selected constant value. The expansion of the control spring 70 causes the spring 34 to return the piston 26 to the neutral position and the inlet control valve 50 to close the inlet passage 42.

When the weight of the loading of the vehicle is reduced to raise the level of the vehicle body, the suspension unit 11 is lengthened to cause expansion of the control spring 70 to allow the spring 34 to move the piston actuator 66 and the piston 26 leftwards in the drawing. The piston 26 is gradually moved due to the orifice 32 limiting the flow of hydraulic fluid from the chamber 24 into the chamber 30. When the valve actuator 62 is moved the distance $S_2$ from the neutral position by the piston 26, it is engaged against the projection 64 to open the outlet control valve 56 to cause outflow of the hydraulic fluid from the chamber 18. Concurrently, the second passage 40 only communicates with the groove 25 to cause abrupt inflow of hydraulic fluid from the chamber 24 into the bore 28. As a result, movement of the piston 26 is hastened to cause abrupt increase in the degree of opening of the outlet control valve 56 and therefore in the outflow of hydraulic fluid from the chamber 18 to cause shortening of the suspension unit 11 to compress the control spring 70 and to lower the level of the vehicle body to a former selected constant value. The piston actuator 66 is moved by the compressed spring 70 rightwards to return the piston 26 to the neutral position and to cause the outlet control valve 56 to close the outlet passage 46. Thus, the level of the vehicle body is automatically maintained at the selected constant value.

When it is desired to heighten the level of the vehicle body from, for example, a level condition in which the piston 82 is in a position shown in FIG. 1, the flow control valve 100 is operated to provide communication between the passages 98 and 102 to cause supply of pressurized hydraulic fluid corresponding to the heightened level from the pump 92 into the chamber 84. The piston 82, the piston rod 88 and the piston 68 are moved by the pressurized hydraulic fluid fed into the chamber 84 to compress the control spring 70 to cause it to move the piston actuator 66 and the piston 26 rightwards in opposition to the force of the spring 34. As a result, the inlet control valve 50 is opened similarly to the above mentioned case that the weight of the vehicle loading is increased to cause supply of the pressurized hydraulic fluid from the pump 92 into the chamber 18 thereby to cause lengthening of the suspension unit 11 to heighten the level of the vehicle body and to cause expansion of the control spring 70. The expansion of the spring 70 allows the spring 34 to return the piston 26 to the neutral position to cause the inlet control valve 50 to close the inlet passage 42. In this instance, the level of the vehicle body is heightened by a distance which the piston 68 or 82 has been moved with respect to the cylinder 12 or 78 by the pressurized hydraulic fluid fed into the chamber 18 or 84, respectively.

When it is desired to lower the level of the vehicle body from, for example, a level condition in which the piston 82 is spaced a certain distance from a left end wall surface in the drawing of the bore 80, the flow control valve 100 is operated to provide communication between the passages 102 and 108 to cause exhaust of hydraulic fluid corresponding to the lowered level from the chamber 84 to the sump 104. This causes lengthening of the control spring 70 to move the piston 82, the piston rod 88 and the piston 68 leftwards and to allow the spring 34 to move the piston actuator 62 and the piston 26 leftwards. As a result, the outlet control valve 56 is opened in the same manner as mentioned above in the case that the weight of the vehicle loading is reduced to cause exhaust of hydraulic fluid from the chamber 18 into the sump 104 thereby to cause shortening of the suspension unit 11 to lower the level of the vehicle body and to cause compression of the control spring 70. The piston actuator 66 is moved by the compressed spring 70 rightwards to return the piston 26 to the neutral position to cause the outlet control valve 56 to close the outlet passage 46. In this instance, the level of the vehicle body is lowered by a distance which the piston 68 or 82 has been moved with respect to the cylinder 12 or 78 by exhaust of the hydraulic fluid from the chamber 18 or 84 respectively.

As is apparent from the foregoing, in the conventional hydropneumatic suspension unit 11, the vehicle level maintaining device has been used for adjusting or changing the level of the vehicle body to a different optional value in the same manner as used for maintaining the vehicle body level. As a result, the conventional suspension unit has had an inconvenience that an undesirably long time is required for adjusting the vehicle body level to a selected higher or lower value. This is due to the orifice 32 which delays the movement of the piston 26 for opening and closing the inlet and outlet control valves 50 and 56. Because it is in fact difficult to make the clearances $S_1$ and $S_2$ uniform throughout the hydropneumatic suspension units of the respective wheels of the vehicle when the suspension units are produced, the vehicle body levels of the respective wheels have been adjusted to a desired value with a different time lag with respect to each other due to the slow response as stated above of the vehicle level adjusting device when the vehicle level adjusting operation is performed.

The invention proposes a hydropneumatic suspension unit comprising an improved vehicle level adjusting device which is capable of quickly moving the piston 122 when the vehicle level is adjusted to a higher or lower value so that the vehicle level adjusting operation is quickly accomplished.

Figure 2:
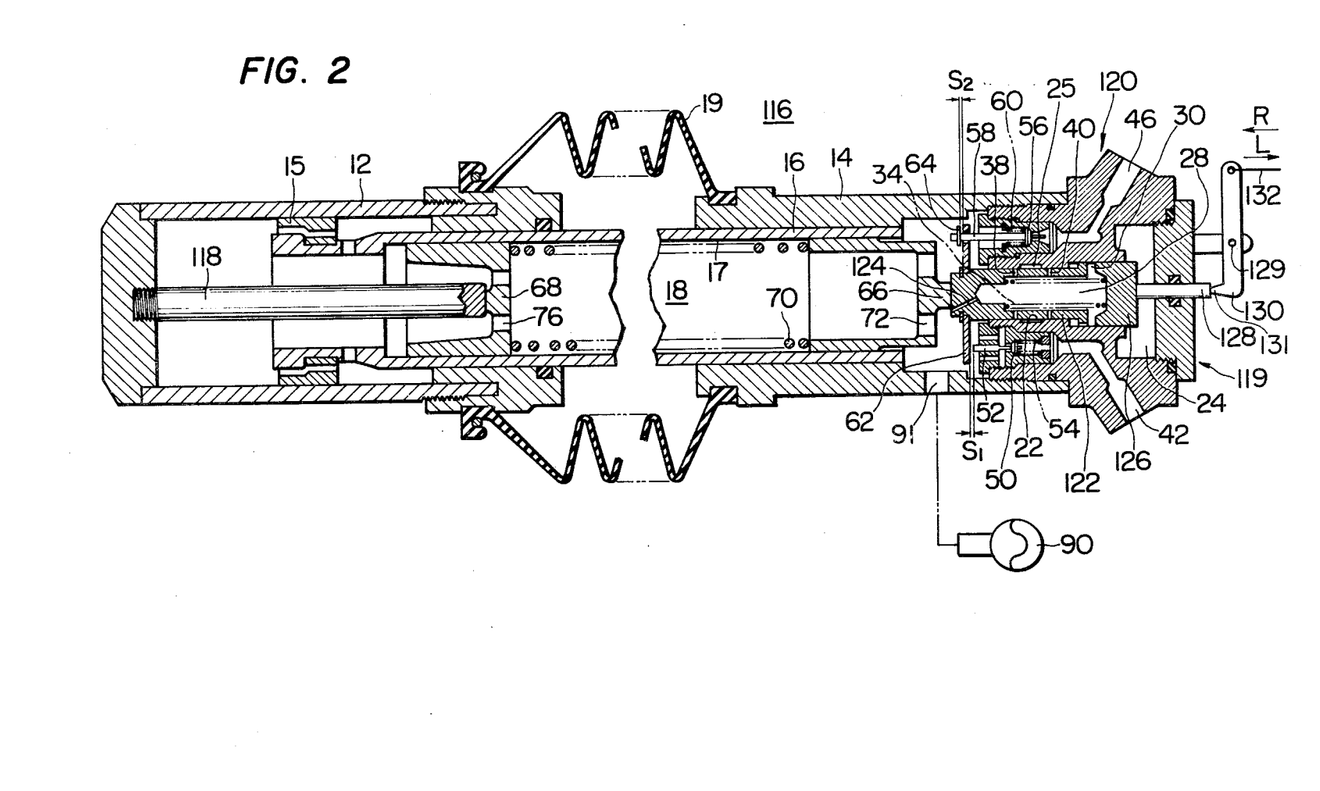
FIG. 2 is a schematic cross sectional view of a first preferred embodiment of a hydropneumatic suspension unit according to the present invention.

Referring to FIG. 2 of the drawings, there is shown an improved hydropneumatic suspension unit or strut according to the invention. In FIG. 2, the same component elements and parts as those of the unit 11 shown in FIG. 1 are designated by the same reference numerals as those used in FIG. 1. The descriptions as to these same component elements and parts are omitted for brevity.

The improved hydropneumatic suspension unit, generally designated by the reference numeral 116, is characterized in that an operating rod 118 is provided which is fixedly secured at one end thereof to the first cylinder 12 in place of the piston rod 88 of the suspension unit 11 of FIG. 1, and that a vehicle level adjusting device 119 is provided at a cylinder head 120 in place of the vehicle level adjusting device of the suspension unit 11 which is provided in the first cylinder 12. The operating rod 118 is engaged at the other end thereof against the piston 68. A piston 122 is slidably fitted in the bore 22 formed in the cylinder head 120. The piston 122 is different from the piston 26 of the suspension unit 11 in that it is formed with an orifice 124 which functions similarly to the orifice 32 of the unit 11 but directly provides communication between the interior of the second cylinder 14 and the bore 28, formed in the piston 122, without passing by way of the chamber 24. The cylinder head 120 is different from the cylinder head 20 of the suspension unit 11 in that it is provided with a piston actuator 126 and an operating rod 128 in place of the partition 29 of the unit 11. The piston actuator 126 is in the form of a piston and is slidably fitted in the cylinder head 120 coaxially with the piston 122 and faces the piston 122 in such a manner that the fluid chamber 30 is defined between the piston 122 and the piston actuator 126. The piston actuator 126 separates the chambers 24 and 30 from each other. The spring 34 is located in the bore 28 and the chamber 30 to urge the piston 122 and the piston actuator 126 in opposite directions. The operating rod 128 is engaged at one end thereof against the piston actuator 126 and projects at the other end from the cylinder head 120 externally of the second cylinder 14. The operating rod 128 serves normally as a stop for preventing rightward movement of the piston actuator 126. A lever 130 is swingably supported at its fulcrum 129 by the cylinder head 120 and is engaged at one end 131 thereof against the other end of the operating rod 128. A control rod 132 is connected to the other end of the lever 130 and is manipulated by the vehicle driver to cause swinging movement of the lever 130 in opposite directions. A wire can be used in place of the control rod 132. The piston actuator 126, the operating rod 128, the lever 130 and the control rod 132 constitute the vehicle level adjusting device 119 for quickly adjusting or changing the level of the vehicle body to a different optional value for causing the piston 122 to quickly move to open the inlet or outlet control valve 50 or 56 without a time delay.

Figure 3:
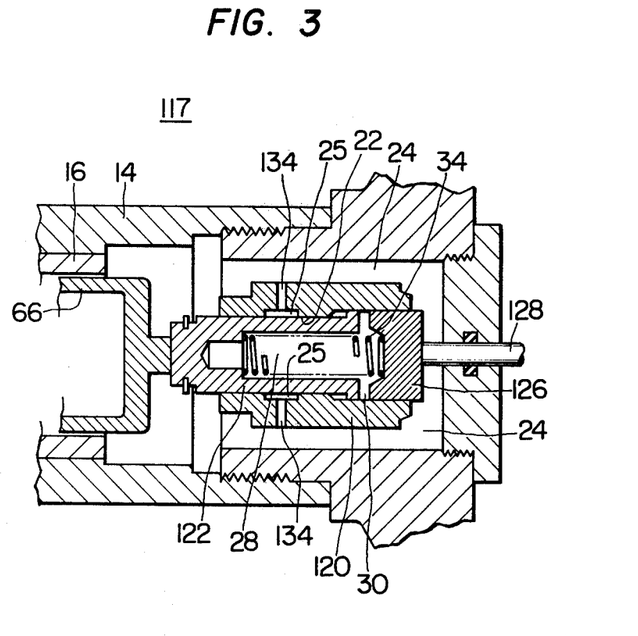
FIG. 3 is a schematic cross sectional view of a section of the hydropneumatic suspension unit shown in FIG. 2 which section is not shown in FIG. 2.

Referring to FIG. 3 of the drawings, there is shown a cross section of an upper part 117 of the suspension unit 116 in which section a portion of the chamber or passage 24 is revealed which portion is not shown in FIG. 2 but is mentioned hereinbefore with respect to FIG. 1.

Furthermore, in FIG. 3 the passage is revealed which is not shown in FIG. 2 but is mentioned hereinbefore with respect to FIG. 1 as a passage providing communication between the chamber 24 and the groove 25 and which is designated by the reference numeral 134 in FIG. 3.

The hydropneumatic suspension unit 116 thus described is operated in the following manner:

When the vehicle body level changing operation is not performed, the piston actuator 126 is prevented by the operating rod 128 from being moved away from the piston 122 and is maintained at, for example, a position shown in FIG. 2. As a result, when the suspension unit 116 is shortened or lengthened due to variation in a load or the weight of the vehicle loading applied to the suspension unit 116 so that the piston 122 is moved by the force of the spring 70 through the piston actuator 66 or by the force of the spring 34, the inlet or outlet control valve 50 or 56 is opened by movement of the valve actuator 62 delayed by the orifice 124 to control the vehicle body level to a predetermined or selected value, similarly to the case of the suspension unit 11 described hereinbefore.

When it is desired to raise the vehicle body level, the control rod or control wire 132 is moved or is allowed to move in the direction of the arrow R shown in FIG. 2 to allow the hydraulic fluid pressure in the chamber 24 to move the operating rod 128 away from the piston actuator 126 into a position corresponding to the vehicle body level to be raised to swing the lever 130 counterclockwise in the drawing to make it possible for the piston actuator 126 to be moved rightwards in the drawing. As a result, the piston 122, the spring 34 and the piston actuator 126 are integrally moved by the force of the control spring 70, due to the incompressibility of hydraulic fluid in the bore 28 and the chamber 30, rightwards into a position in which the piston 126 is engaged against the operating rod 128. The valve actuator 62 is moved rightwards by the rightward movement of the piston 122 to open the inlet control valve 50 to cause supply of pressurized hydraulic fluid from the pump 92 into the chamber 18 of the cylinders 12, 14 and 16. Also, by the rightward movement of the piston 122 the passage 38 communicates with the groove 25 to provide communication between the chamber 24 and the bore 28. This makes it possible for the piston 122 to be freely moved by the force of the spring 34 or 70, without being resisted by the orifice 124, into a position in which the spring 34 is balanced with the control spring 70. The suspension unit 116 and the control spring 70 are lengthened by the pressurized hydraulic fluid fed into the chamber 18 so that the vehicle body level is raised to a desired higher value. When the vehicle body level is raised to the desired value, the piston 122 is moved into the neutral position by the forces of the springs 34 and 70 balanced with each other to cause the inlet control valve 50 to close the inlet passageway 42.

Reversely, when it is desired to lower the vehicle body level, the control rod or control wire 132 is pulled in the direction of the arrow L shown in FIG. 2 to swing the lever 130 clockwise in the drawing to move the operating rod 128 leftwards in the drawing into a position corresponding to the vehicle body level to be lowered. The piston 122 and the valve actuator 62 are moved leftwards integrally with the piston actuator 126 by the operating rod 128 due to the incompressibility of hydraulic fluid in the bore 28 and the chamber 30. The outlet control valve 56 is opened by the leftward movement of the valve actuator 62 to cause exhaust of hydraulic fluid from the chamber 18 into the sump 104. Also, by the leftward movement of the piston 122 the passage 40 communicates with the groove 25 to provide communication between the bore 28 and the chamber 24. As a result, it is rendered possible for the piston 122 to be freely moved by the force of the spring 34 or 70 without being resisted by the orifice 124 into a position in which the spring 34 is balanced with the control spring 70. The suspension unit 116 and the control spring 70 are shortened in response to the exhaust of the hydraulic fluid from the chamber 18 so that the vehicle body level is lowered to a desired lower value. When the vehicle body level is lowered to the desired value, the piston 122 is moved into the neutral position by the forces of the springs 34 and 70 balanced with each other to cause the outlet control valve 56 to close the outlet passageway 46.

When the control rod 132 is manipulated by the driver, because the piston 122 is moved integrally with the piston actuator 126 and the hydraulic fluid confined in the bore 28 and the chamber 30, the piston 122 is quickly moved witout being resisted and delayed by the orifice 124 to open the inlet or outlet control valve 50 or 56 immediately after the manipulation of the control rod 132. Thus, a satisfactory short time is required for adjusting the vehicle body level to a higher or lower value. Accordingly, even if the suspension units of the respective wheels of the vehicle are produced such that each of the clearances $S_1$ and $S_2$ is not uniform throughout the suspension units, the vehicle body levels at the respective wheels are about concurrently changed to a desired higher or lower optional value.

Figure 4:
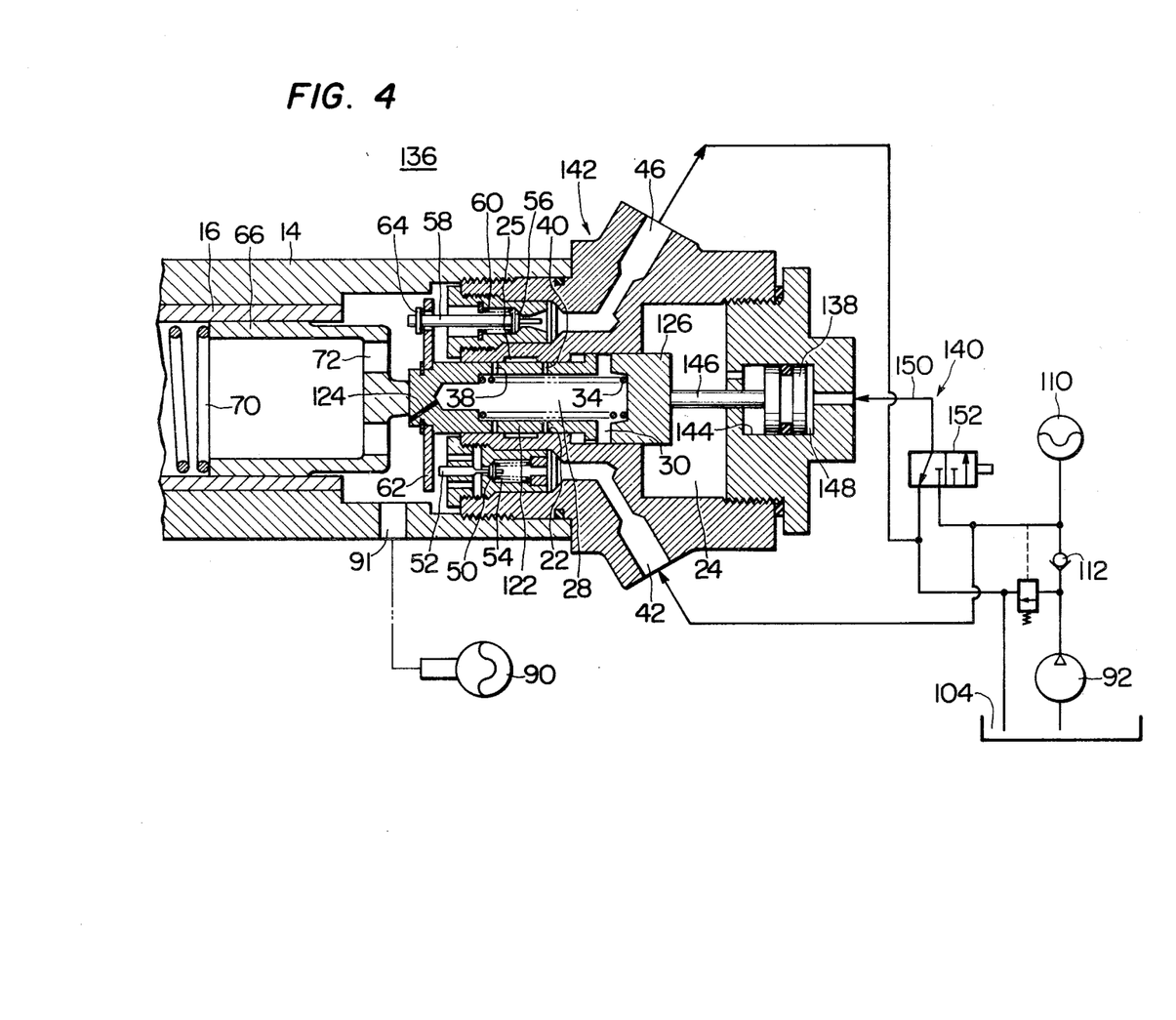
FIG. 4 is a schematic cross sectional view of a part of a second preferred embodiment of a hydropneumatic suspension unit according to the invention.

Referring to FIG. 4 of the drawings, there is partially shown a second preferred embodiment of a hydropneumatic suspension unit according to the invention. In FIG. 4, the same component elements and parts as those shown in FIGS. 1 and 2 are designated by the same reference numerals as those used in FIGS. 1 and 2. The description of the same component elements and parts is omitted for brevity. The hydropneumatic suspension unit shown in FIG. 4 which is generally designated by the reference numeral 136 is characterized in that a hydraulically operated piston 138 is employed in a vehicle level adjusting device 140 in place of the lever 130 and the control member 132 of the suspension unit 116 shown in FIG. 2.

As shown in FIG. 4, the second cylinder 14 is provided with a cylinder head 142 which is different from the cylinder head 120 of the suspension unit 116 in that it is formed therein with a bore 144. The piston 138 is slidably fitted in the bore 144. A piston rod 146 extends from the piston 138 and is engaged against the piston actuator 126. A fluid chamber 148 is defined between the piston 138 and an end wall surface of the bore 144. The fluid chamber 148 is alternatively communicable with the pump 92 and the sump 104 through passage means 150 and a flow control valve 152 which is operated, for example, electrically or electromagnetically by manipulation of the vehicle driver. With the suspension unit 136 thus described, when it is desired to raise the vehicle body level, the flow control valve 152 is operated to provide communication between the fluid chamber 148 and the sump 104 to cause exhaust of a quantity of hydraulic fluid from the fluid chamber 148 into the sump 104. This causes the pressurized hydraulic fluid in the chamber 24 to move the piston rod 146 and the piston 138 rightwards in the drawing into a position corresponding to the vehicle body level to be raised. As a result, the inlet control valve 50 is opened by the valve actuator 62 moved together with the piston 122 moved integrally with the piston actuator 126 by the force of the control spring 70 and that the vehicle body level is changed to a selected higher value, similarly as described above in connection with FIg. 2. When it is desired to lower the vehicle body level, the flow control valve 152 is operated to provide communication between the pump 92 and the fluid chamber 148 to cause supply of a quantity of pressurized hydraulic fluid from the pump 92 into the fluid chamber 148. As a result, the outlet control valve 56 is opened by the valve actuator 62 moved together with the piston 122 moved integrally with the piston actuator 126 by the piston rod 146 and the piston 138 moved leftwards in the drawing into a position, corresponding to the vehicle body level to be lowered, by the pressurized hydraulic fluid fed into the fluid chamber 148 to lower the vehicle body level to a selected lower value, similarly as described above in connection with FIG. 2. As is apparent from the construction and arrangement of the suspension unit 136, the vehicle level maintaining operation is accomplished similarly as described above in connection with FIG. 2.

It will be appreciated that the invention provides a hydropneumatic suspension unit provided with a vehicle level selector device comprising reaction means such as a piston actuator 126 which is normally prevented from being moved to have an orifice 124 function as a dashpot of a piston 122 having a levelling valve actuator and which, when it is desired to change the level of the vehicle body to an optional value, is quickly moved integrally with the piston 122 to render the dashpot ineffective and to satisfactorily reduce the time necessary for changing the vehicle body level.

What is claimed is:

1. A hydropneumatic suspension unit for a wheeled vehicle, comprising first and second bodies which are connected to each other movably relative to each other and which define therebetween a first chamber, a gas spring communicating with said first chamber, inlet passage means communicating with said first chamber, outlet passage means communicating with said first chamber, an inlet valve for normally closing said inlet passage means and for opening said inlet passage means for causing supply of pressurized hydraulic fluid into said first chamber, an outlet valve for normally closing said outlet passage means and for opening said outlet passage means for causing exhaust of hydraulic fluid from said first chamber, first and second pistons which each are slidably fitted in said second body and which face each other and which define therebetween a second chamber;

said valves being movable relative to said pistons, orifice means defining a restricted passage providing communication between said first and second chambers, first biasing means for urging said first and second pistons in opposite first and second directions, second biasing means for urging said first piston in said second direction, a valve actuator connected to said first piston for causing said inlet valve to open said inlet passage means in response to movement of said first piston in said second direction in excess of a predetermined distance and for causing said outlet valve to open said outlet passage means in response to movement of said first piston in said first direction in excess of a predetermined distance, and operating means for normally preventing said second piston from being moved in said second direction integrally with said first piston by said second biasing means and for, when it is desired to lengthen said suspension unit, allowing said second biasing means to move said first and second pistons in said second direction and for, when it is desired to shorten said suspension unit, moving said first and second pistons in said first direction.

2. A hydropneumatic suspension unit as claimed in claim 1, in which said operating means comprises an operating rod engaged at one end against said second piston and projecting at the other end outside said second body, a lever swingably supported at a fulcrum by said second body and engaged at one end against said other end of said operating rod, and a control member operatively connected to the other end of said lever for normally having said operating rod prevent said second piston from being moved in said second direction by said second biasing means integrally with said first piston and for, when it is desired to lengthen said suspension unit, allowing said second biasing means to move said first and second pistons in said second direction and for, when it is desired to shorten said suspension unit, causing said operating rod to move said first and second pistons in said first direction.

3. A hydropneumatic suspension unit as claimed in claim 1, in which said operating means comprises a third piston slidably fitted in said second body and having on a side thereof a third chamber which is filled with hydraulic fluid and which is alternatively communicable with a pressurized hydraulic fluid source and a hydraulic fluid sump, a piston rod extending from said third piston and engaged against said second piston, and a flow control valve for controlling communication between said third chamber and said source and between said third chamber and said sump, said flow control valve having a normal position for normally separating said third chamber from said source and said sump for having said third piston and said operating rod prevent said second piston from being moved in said second direction by said second biasing means together with said first piston, and a first position for, when it is desired to lengthen said suspension unit, providing communication between said third chamber and said sump for allowing said second biasing means to move said second piston in said second direction together with said first piston, and a second position for, when it is desired to shorten said suspension unit, providing communication between said third chamber and said source for causing pressurized hydraulic fluid fed into said third chamber to cause said third piston and said operating rod to move said first and second pistons in said first direction.

4. A hydropneumatic suspension unit as claimed in claim 1, in which each of said inlet and outlet valves is of a poppet type and has an axis which is parallel with an axis of said second piston and in the direction of which axis said each valve is movable, and said inlet and outlet valves are arranged symmetrically with respect to said second piston.

5. A hydropneumatic suspension unit as claimed in claim 1, in which said first piston is formed with a bore communicating with said second chamber, and said first piston and said second body both are formed with passage means which provides communication between said bore and said first chamber when said first piston is moved in said first and second directions in excess of predetermined distances, respectively.

6. A hydropneumatic suspension unit as claimed in claim 1, in which said first body is a first cylinder and said second body is a second cylinder slidably fitted in said first cylinder, said second body having at an end thereof another piston slidably fitted in said first cylinder.

7. A hydropneumatic suspension unit as claimed in claim 6, in which said second biasing means is a spring located in a bore formed in said second cylinder, said spring having a diameter near that of said bore, said suspension unit further comprising a first spring seat slidably fitted in said bore of said second cylinder and engaged at one end against said first piston and at the other end against said spring, a second spring seat slidably fitted in said bore of said second cylinder and engaged at one end against said spring, and a rod fixedly secured at one end to said first cylinder and engaged at the other end against said second spring seat.

8. In a hydropneumatic suspension for a wheeled vehicle having a source of hydraulic fluid under pressure, an elongatable telescopic strut comprising:

first and second members telescopically interconnected to define a first variable volume chamber therebetween;

a gas spring in fluid communication with said first chamber;

means defining an inlet passage in said first member, said inlet passage leading to said first chamber;

means defining an outlet passage in said first member, said outlet passage leading from said first chamber;

an inlet valve disposed in said inlet passage;

an outlet valve disposed in said outlet passage;

means defining a bore within said first member;

a first piston reciprocatively received in said bore, said piston being slidably from a home position in a first direction through a first distance to a first operative position, and slidable from said home position in a second direction to a second operative position, said first piston having an actuating member which opens said outlet valve upon said first piston assuming said first operative position and which opens said inlet valve upon said first piston assuming said second operative position;

first biasing means disposed in said first chamber for biasing said first piston in said first direction, said first biasing means being arranged so that the biasing force applied thereby to said first piston increases with movement of said second member toward said first member; and control means for temporarily moving said first piston from said home position to said first and second operative positions so that said outlet and inlet valves are temporarily opened to communicate said source of hydraulic fluid under pressure with said first chamber for contraction and elongation of said strut respectively, said control means taking the form of a second piston reciprocatively received in said bore to define a second variable volume chamber between said first and second pistons;

said values being movable relative to said pistons a second biasing means disposed in said second chamber for biasing said first and seond pistons away from each other;

means defining an orifice which fluidly intercommunicates with said first and second chambers; and manually operable means for locating said second piston in predetermined positions within said bore.

* * * * *

UNITED STATES PATENT AND TRADEMARK OFFICE
CERTIFICATE OF CORRECTION

PATENT NO. : 4,177,977
DATED : December 11, 1979
INVENTOR(S) : TOMOYOSHI SEKIGUCHI ET AL It is certified that error appears in the above-identified patent and that said Letters Patent are hereby corrected as shown below:

The assignees in the above-identified patent should be:

NISSAN MOTOR COMPANY, LIMITED and
    ATSUGI MOTOR PARTS COMPANY, LIMITED

Signed and Sealed this

*Twenty-ninth* Day of *April 1980*

[SEAL]

*Attest:*

SIDNEY A. DIAMOND

*Attesting Officer*      *Commissioner of Patents and Trademarks*